United States Patent
De Pauw

(10) Patent No.: US 8,362,716 B2
(45) Date of Patent: Jan. 29, 2013

(54) DRIVE APPARATUS FOR FRAME DEFLECTION AND METHOD

(75) Inventor: Adriaan P. D. De Pauw, Eindhoven (NL)

(73) Assignee: Entropic Communications, Inc., San Diego, CA (US)

( * ) Notice: Subject to any disclaimer, the term of this patent is extended or adjusted under 35 U.S.C. 154(b) by 1427 days.

(21) Appl. No.: 10/537,673

(22) PCT Filed: Dec. 3, 2003

(86) PCT No.: PCT/IB03/05606
§ 371 (c)(1),
(2), (4) Date: Sep. 30, 2009

(87) PCT Pub. No.: WO2004/054236
PCT Pub. Date: Jun. 24, 2004

(65) Prior Publication Data
US 2011/0007038 A1    Jan. 13, 2011

Related U.S. Application Data

(60) Provisional application No. 60/431,344, filed on Dec. 6, 2002.

(51) Int. Cl.
G09G 1/04    (2006.01)
H04N 5/655    (2006.01)

(52) U.S. Cl. .................................. 315/364; 348/827

(58) Field of Classification Search .................. 348/707, 348/805, 806, 827, 829; 315/1, 3, 4, 364, 315/382.1, 386, 391, 396, 397, 399, 403, 315/404, 405
See application file for complete search history.

(56) References Cited

U.S. PATENT DOCUMENTS

| 5,686,800 | A | | 11/1997 | Kim | |
|---|---|---|---|---|---|
| 5,953,081 | A | | 9/1999 | Ryu | |
| 6,013,989 | A | * | 1/2000 | Lee | 315/371 |
| 6,084,646 | A | * | 7/2000 | Lee | 348/806 |
| 6,215,257 | B1 | | 4/2001 | Choe | |
| 6,297,861 | B1 | * | 10/2001 | Jo | 348/806 |
| 6,340,871 | B1 | * | 1/2002 | Kang | 315/370 |
| 6,369,780 | B1 | * | 4/2002 | Gleim et al. | 345/13 |
| 6,411,768 | B2 | * | 6/2002 | Lee | 386/306 |
| 6,870,575 | B2 | * | 3/2005 | Hibi et al. | 348/625 |

FOREIGN PATENT DOCUMENTS

| DE | 4201700 A1 | 7/1993 |
|---|---|---|
| JP | 2001210255 A | 8/2001 |
| JP | 2007107503 A | 4/2007 |

OTHER PUBLICATIONS

International Search Report for PCT/IB2003/005606 mailed Feb. 23, 2004.

* cited by examiner

Primary Examiner — Minh D A

(57) ABSTRACT

A frame drive circuit for a CRT device having a deflection processor (14) which develops a deflection processor output signal includes a frame coil (16) having a first core half (12) and a second core half (18), and a first driver (20) and a second driver (22). The deflection processor output signal is applied to each of the first driver (20) and the second driver (22). Each of the first driver (20) and the second driver (22) are selectively operative independently of each other to develop respectively a first coil drive signal (24 OUT) and a second coil drive signal (26 OUT) as a function of the deflection processor output signal. The first coil drive signal (24 OUT) and the second coil drive signal (26 OUT) are applied to a respective one of the first coil half (12) and said second coil half (18).

5 Claims, 2 Drawing Sheets

DRIVE APPARATUS FOR FRAME DEFLECTION AND METHOD

CROSS REFERENCE TO RELATED APPLICATION

This application claims the benefit of U.S. provisional application Ser. No. 60/431,344 filed 6 Dec. 2002, which is incorporated herein by reference.

The present invention relates to deflection compensation, e.g. in Cathode Ray Tube (CRT) devices, e.g. monitors or televisions, and more particularly to a device and method for correcting various forms of deflection including rotation, trapezoidal and parallelogram deflection.

A CRT device forms an image using an electron beam focused on a fluorescent screen by electromagnetic deflection. The deflection is accomplished by applying current of sawtooth waveforms to horizontal and vertical coils.

A typical monitor is used as a peripheral device for a computer that provides video signals and horizontal and vertical sync signals necessary for forming an image at the monitor. An electron gun forms an electron beam according to the video signals. The electron beam is deflected in accordance with the horizontal and vertical sync signals horizontally and vertically by the horizontal and vertical coils on the fluorescent screen in front, thus representing a specified picture The earth magnetic field influences deflection of electron beam by the horizontal and vertical deflecting coils, thus the picture is displayed on the screen in a monitor on the tilt to left or right. An additional coil is utilized in the prior art to complement for the tilt of the picture displayed by creating a complementing magnetic field. Such additional coil may be placed on the funnel portion of the tube used in the CRT device and the generated complementing magnetic field moves the tilt of the picture on the screen clockwise or counterclockwise, and the degree of tilt complement is variable.

However, the magnetic field created by the complementing coil may disadvantageously affect the quality of picture. Additionally, this implementation involves a problem that a special complement coil is required. Other prior art devices to correct for distortion are disclosed in U.S. Pat. Nos. 5,953,081, 5,686,800 and JP patent Publication 07-107503. Patent document U.S. Pat. No. 5,953,081, incorporated herein by reference, discloses a system for correcting the tilt of a displayed picture due in part to the Earth magnetic field. In this document, the tilt of the picture can be controlled by controlling the tilts of the horizontal and vertical sawtooth waves applied to the horizontal and vertical coils respectively. Essentially horizontal and vertical parallelograms are simultaneously controlled by synthesizing the horizontal and vertical sawtooth waves, after controlling their amplitudes and phases with vertical and horizontal position control signals, respectively before sending them to a vertical output unit and a horizontal oscillation unit thereby changing the tilt of the picture. In such implementation two respective sawtooth signals are applied to the respective horizontal and vertical coils. However the same sawtooth signal is applied to each of the two coils. Thus both halves of the horizontal and vertical coils are driven in series.

It is an object of the present invention to provide a novel apparatus and method that overcomes one or more limitations of the prior art hereinabove enumerated.

According to the present invention, a frame drive circuit for a device having a deflection processor which develops a deflection processor output signal includes a frame coil having a first core half and a second core half, and a first driver and a second driver. The deflection processor output signal is applied to each of the first driver and the second driver. Each of the first driver and the second driver are selectively operative independently of each other to develop respectively a first coil drive signal and a second coil drive signal as a function of the deflection processor output signal. The first coil drive signal and the second coil drive signal are applied to a respective one of the first coil half and said second coil half.

A feature of the present invention is that the existing frame coil such as the horizontal coil or the vertical coil, is split into separate core halves with each core half being separately driven, instead of in series as in the prior art. An advantage of the separate driving of the core halves is that greater design freedom is allowed, and correction of distortion may be accomplished without additional hardware, such as that disclosed in the prior art references.

These and other objects, advantages and features of the present invention will become readily apparent to those skilled in the art from a study of the following Description of the Exemplary Preferred Embodiments when read in conjunction with the attached Drawing and appended Claims.

Figure 1:
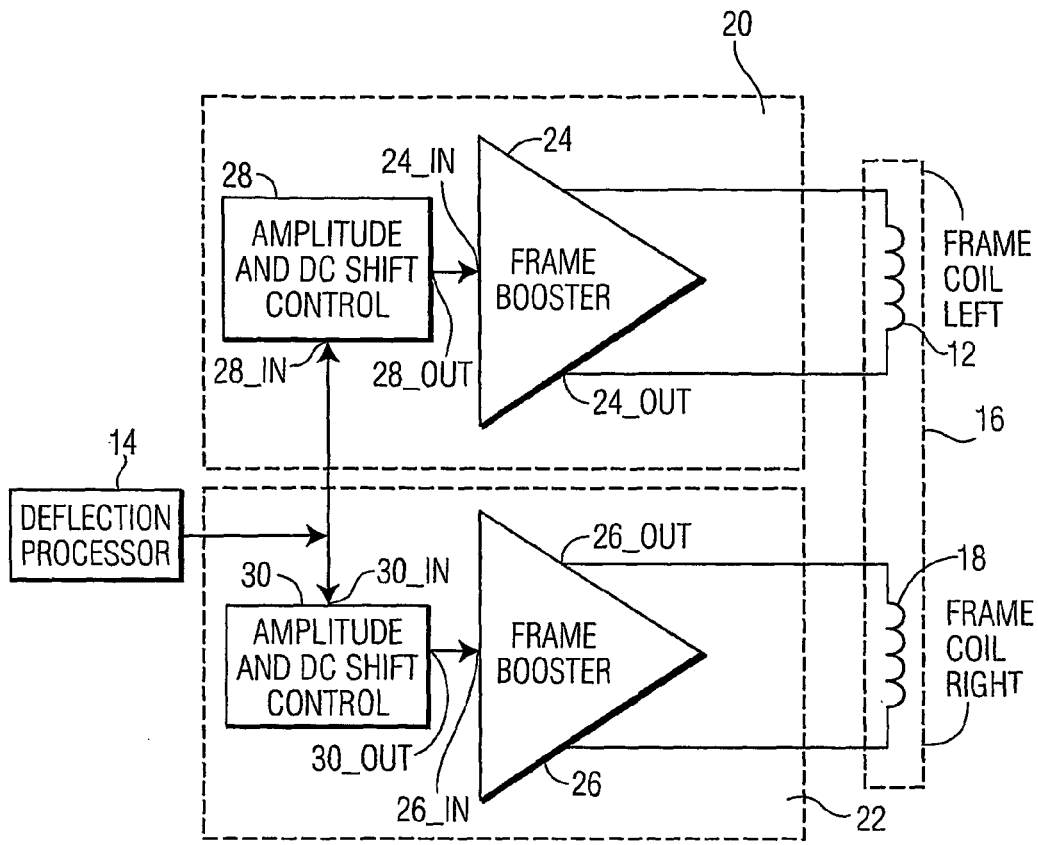
FIG. 1 is a schematic diagram of a frame drive circuit constructed according to the principles of the present invention.

Referring now to FIG. 1, there is shown a frame drive circuit 10 for a CRT device such as a CRT monitor or a CRT television set and the drive circuit 10 includes a deflection processor 14 and a frame coil 16. According to the present invention, the frame drive circuit 10 includes a first core half 12 and a second core half 18 of the frame coil 16 and a first coil driver 20 and a second coil driver 22.

The deflection processor 14 develops, as is well know, a deflection processor output signal. The deflection processor output signal is applied to each of the first driver 20 and the second driver 22. Each of the first driver 20 and the second driver 22 are selectively operative independently of each other to develop respectively a first coil drive signal and a second coil drive signal as a function of the deflection processor output signal. The first coil drive signal and the second coil drive signal are in turn applied to a respective one of the first coil half 12 and the second coil half 18. As will be shown hereinafter, the two coil signals may differ in amplitude and one may be DC shifted relative to the other. The inventor has realized that applying different current to the two coils enables correcting the tilting of the picture without the need of an extra rotation coil used in some high-end CRT display system. The current difference enables correcting trapezoidal, rotational and parallelogram tilt of the picture. The adjustment of the respective coil currents may be effected at the time of manufacture of the display through testing or directly by the user during a tilt correction set up.

Figure 2:
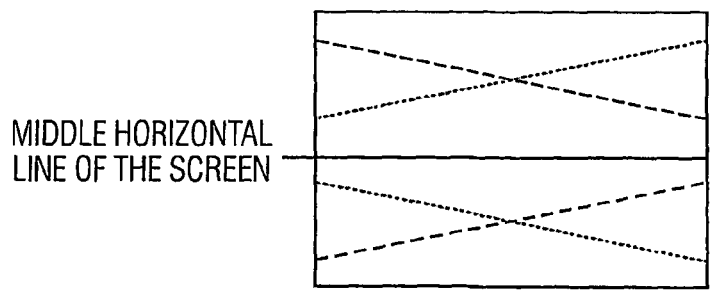
FIG. 2 is a representation of rotation correction accomplished by the present invention.

In one embodiment of the present invention, each of the first driver 20 and the second driver 22 amplify the deflection processor output signal to develop each respective one of the first coil drive signal and the second coil drive signal. In this embodiment, the amplification of the deflection processor output signal may be selected such that the resultant one of the first coil drive signal and the second coil drive signal when applied to the first coil half 12 and the second coil half 18, respectively, are operative to correct rotation of an image of the CRT monitor, as best seen in FIG. 2.

Figure 4:
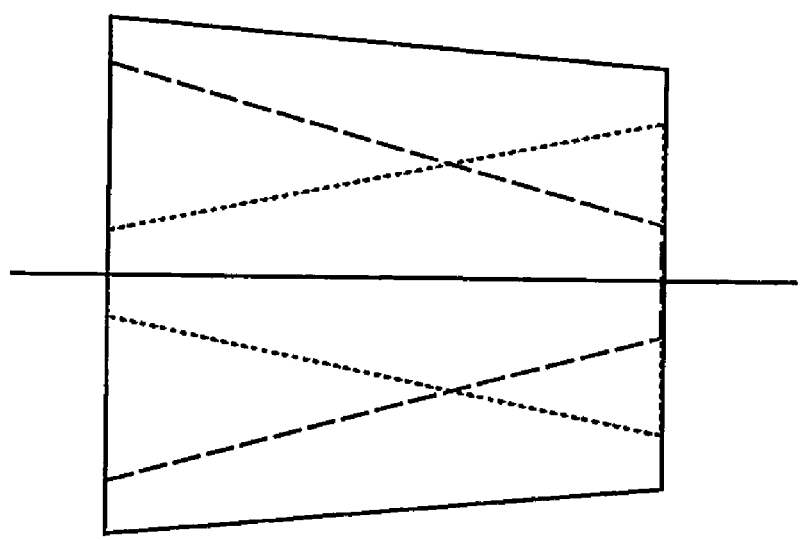
FIG. 4 is a representation of trapezoidal correction accomplished by the present invention.

In this embodiment the amplification of the deflection processor output signal by each of the first driver 20 and the second driver 22 may be substantially equal if the rotation of the CRT image is caused by a constant ambient field, such as the magnetic field of the earth. Furthermore, the ratio of the amplification of the deflection processor output signal may also be selectively adjusted to provide for trapezoidal correction, as best seen in FIG. 4.

Figure 3:
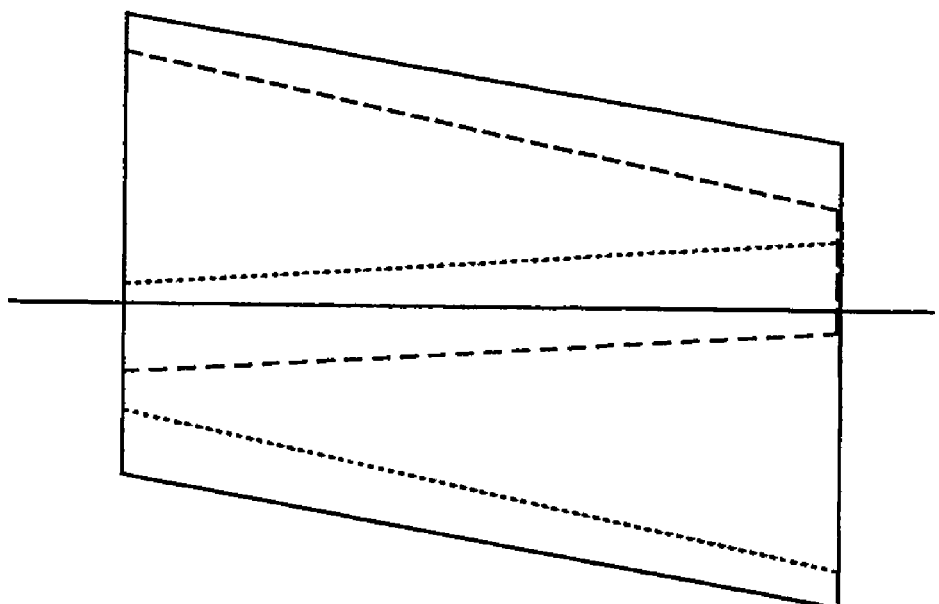
FIG. 3 is a representation of parallelogram correction accomplished by the present invention.

In another embodiment of the present invention, each of the first driver 20 and the second driver 22 further DC shift the deflection processor output signal to develop each respective one of the first coil drive signal and the second coil drive signal. In this embodiment, the DC level shift of the deflection processor output signal may be selected such that the resultant one of the first coil drive signal and the second coil drive signal when applied to the first coil half 12 and the second coil half 18, respectively, are operative to parallelogram distortion of an image of the CRT monitor, as best seen in FIG. 3.

It is contemplated by the present invention that the amplification of the deflection processor output signal, whether independently, in lockstep or in ratio, as well as the DC level shift, may all be utilized, alone or in any combination, in practicing the present invention. Usually, a CRT image will exhibit several forms of distortion, and correction of such distortion is accomplished by separate user settings for each type of distortion, as in the prior art. The present invention allows for the simplified apparatus to correct for several types of distortion simultaneously.

Accordingly each of the first driver 20 and the second driver 22 include an amplifier 24, 26 having an input 24_IN, 26_IN and an output 24_OUT, 26_OUT. The input 24_IN, 26_IN of each amplifier 24, 26 is adapted to receive the deflection processor output signal. The output 24_OUT, 26_OUT of each amplifier 24, 26 develops an amplified signal for application to a respective one of the first coil half 12 and the second coil half 18.

Each of the first driver 20 and the second driver 22 may further include a DC level shifter 28, 30 having respective inputs 28_IN, 30_IN and respective outputs 28_OUT, 30_OUT. The input 28_IN, 30_IN of each DC level shifter 28, 30 is adapted to receive the deflection processor output signal from the deflection processor 14. The output 28_OUT, 30_OUT of each DC level shifter 28, 30 develops a DC level shifted signal for application to a respective one of the first coil half 12 and the second coil half 18. The amplifier 24, 26 and the DC level shifter 28, 30 of each driver 20, 22 may be separate components connected in series or a single circuit, as seen in FIG. 1, that provides both functions.

There has been described hereinabove a novel frame drive circuit constructed according to the principles of the present invention. Those skilled in the art may now make numerous uses of, and departures from, the above-described embodiments without departing from the inventive concepts disclosed herein. Accordingly, the present invention is to be described solely by the lawfully permitted scope of the appended Claims.

What is claimed is:

1. A frame drive circuit system comprising:
   a deflection processor configured to develop a deflection processor output signal;
   a first driver and a second driver, each configured to receive the deflection processor output signal,
   each of the first driver and the second driver being selectively operative independently of each other to develop respectively a first coil drive signal and a second coil drive signal as a function of the deflection processor output signal;
   a first coil half frame and a second coil half frame configured to receive the first coil drive signal and the second coil drive signal respectively;
   wherein each of the first driver and the second driver are configured to amplify the deflection processor output signal to develop each respective one of the first coil drive signal and the second drive signal, wherein each of said the first driver and said the second driver are configured to DC shift said the deflection processor output signal to develop each respective one of said the first coil drive signal and said the second coil drive signal.

2. The frame drive circuit as set forth in claim 1 wherein each of the first driver and the second driver include an amplifier having an input and an output, the input of each amplifier being configured to receive the deflection processor output signal, the output of each amplifier configured to develop an amplified signal for application to a respective one of the first coil half and the second coil half.

3. The frame drive circuit as set forth in claim 1 wherein each of the first driver and the second driver include a DC level shifter having an input and an output, the input of each DC level shifter being configured to receive the deflection process output signal, the output of each DC level shifter configured to develop a DC level shifted signal for application to a respective one of the first coil half and the second coil half.

4. A method of developing a deflection processor output signal using a frame drive circuit comprising:
   applying the deflection processor output signal to a first driver and a second driver;
   wherein the first driver and second driver are selectively operative independently of each other;
   developing a first coil drive signal and a second coil drive signal as a function of the deflection processor output signal;
   applying the first coil drive signal and the second coil drive signal to a respective first coil half and a second coil half of the frame coil; and
   amplifying the deflection processor output signal using the first driver and second driver to develop the respective first coil drive signal and second coil drive signal and DC level shifting the deflection processor output signal with the first driver and second driver to develop each respective one of the first coil drive signal and the second coil drive signal.

5. The method of claim 4 further comprising:
   receiving the deflection processor output signal in an input to the first and second driver;
   developing an output of the first and second driver wherein the output is a DC level shifted signal;
   applying the output of each DC level shifted signal to a respective one of the first coil half and the second coil half.

* * * * *